(12) United States Patent
Park

(10) Patent No.: US 9,925,967 B2
(45) Date of Patent: *Mar. 27, 2018

(54) BRAKE ACTUATOR

(71) Applicant: G&P AUTOMOTIVE CO., LTD., Jeollabuk-do (KR)

(72) Inventor: Han Joo Park, Jeollabuk-do (KR)

(73) Assignee: MIRAEVC CO., LTD., Jeollabuk-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/307,732

(22) PCT Filed: May 7, 2015

(86) PCT No.: PCT/KR2015/004550
§ 371 (c)(1),
(2) Date: Oct. 28, 2016

(87) PCT Pub. No.: WO2016/006817
PCT Pub. Date: Jan. 14, 2016

(65) Prior Publication Data
US 2017/0050628 A1    Feb. 23, 2017

(30) Foreign Application Priority Data

Jul. 11, 2014  (KR) .................. 10-2014-0087214

(51) Int. Cl.
*F16D 65/28* (2006.01)
*B60T 13/38* (2006.01)
(Continued)

(52) U.S. Cl.
CPC ............ *B60T 13/38* (2013.01); *B60T 17/083* (2013.01); *F16D 65/28* (2013.01);
(Continued)

(58) Field of Classification Search
CPC ......... F16D 65/28; B60T 13/38; B60T 17/083
(Continued)

(56) References Cited

U.S. PATENT DOCUMENTS 5,722,311 A * 3/1998 Pierce .................. B60T 17/083
                                                      92/130 A
6,907,818 B2 * 6/2005 Anderson ............. B60T 13/261
                                                      92/62
(Continued)

FOREIGN PATENT DOCUMENTS

JP    2013-233920    11/2013
KR    10-1176856    8/2012
(Continued)

OTHER PUBLICATIONS

International Search Report dated May 28, 2015 for PCT/KR2015/004550.

*Primary Examiner* — Christopher P Schwartz

(57) ABSTRACT

Disclosed is a brake actuator which is able to adjust the operational states of a brake connection to the lower end of a push rod disposed movable upward or downward while passing through the lower end of a service brake housing in such a way that a diaphragm moves upward or downward a pressure plate in response to the elastic force of a compressive spring in a spring chamber and the adjustment of an air pressure in a pressure chamber.

3 Claims, 3 Drawing Sheets

(51) Int. Cl.
  *B60T 17/08*    (2006.01)
  *F16D 121/08*   (2012.01)
  *F16D 125/58*   (2012.01)
  *F16D 125/08*   (2012.01)

(52) U.S. Cl.
  CPC ...... *F16D 2121/08* (2013.01); *F16D 2125/08* (2013.01); *F16D 2125/582* (2013.01)

(58) Field of Classification Search
  USPC .......................... 92/63, 130; 188/153 D, 170
  See application file for complete search history.

(56) References Cited

U.S. PATENT DOCUMENTS

| | | | | |
|---|---|---|---|---|
| 7,513,341 | B2* | 4/2009 | Lachermeier | B60T 17/083 |
| | | | | 188/153 D |
| 7,845,474 | B2* | 12/2010 | Schodrowski | B60T 17/083 |
| | | | | 188/153 D |
| 2013/0032437 | A1* | 2/2013 | Akin | B60T 17/083 |
| | | | | 188/106 F |
| 2013/0292216 | A1* | 11/2013 | Bradford | B60T 17/083 |
| | | | | 188/106 F |
| 2017/0051803 | A1* | 2/2017 | Park | B60T 13/38 |

FOREIGN PATENT DOCUMENTS

| | | |
|---|---|---|
| KR | 10-2013-0011798 | 1/2013 |
| KR | 10-2013-0011802 | 1/2013 |

\* cited by examiner ates by supplying compressed air, and a spring type emergency brake actuator which operates the brake if the air pressure becomes low.
BRAKE ACTUATOR This application claims the priority of Korean Patent Application Nos. 10-2014-0087214, filed on Jul. 11, 2014 in the KIPO (Korean Intellectual Property Office), the disclosure of which is incorporated herein entirely by reference. Further, this application is the National Stage application of International Application No. PCT/KR2015/004550, filed May 7, 2015, which designates the United States and was published in Korean. Each of these applications is hereby incorporated by reference in their entirety into the present application.

TECHNICAL FIELD

The present invention relates to a brake actuator.

BACKGROUND ART

The air brake system for a vehicle, for example, a bus, a truck, a trailer, other heavy machinery vehicles, and the like is formed of a brake shoe, and a drum assembly which can be driven by an actuator assembly operated by selectively supplying compressed air.

The air brake actuator is formed of a service brake actuator configured to operate a brake in an ordinary driving state by supplying compressed air, and a spring type emergency brake actuator which operates the brake if the air pressure becomes low.

The emergency brake actuator is equipped with, for example, a strong compressive spring which is able to forcibly apply a braking force if the air is eliminated.

These types of springs are collectively called a spring brake.

The pneumatic brake actuator may be a piston type or a diaphragm.

In the diaphragm type, the brake actuator and two pneumatic diaphragm brake actuators, in general, are disposed in a tandem vehicle configuration. There are provided a pneumatic service brake actuator configured to drive an ordinary operative brake, and a spring brake actuator which is able to allow for the parking of a vehicle or an emergency brake.

The service brake actuator and the spring brake actuator includes a housing having an elastic diaphragm which divides the inside of the housing into two fluid chambers.

Meanwhile, the piston brake actuator operates based on the same principle except for the diaphragm, and a piston reciprocates inside a cylinder which is configured to drive the parking brake of a vehicle.

In the conventional service brake actuator, a service brake housing is divided into a service chamber and a pushrod chamber.

The service chamber is connected to the source of compressed air in such a way that a fluid movement is available, and the push rod chamber is equipped with a pushrod and is connected to the brake assembly, and the push rod reciprocates between the inside and outside of the housing, thus locking or unlocking the operative brake which is configured to input the compressed air into the compressed chamber or output it from the compressed chamber.

In the ordinary spring brake actuator, the spring brake housing is divided into a pressure chamber and a spring chamber.

The opposite ends of the piston position at a spring chamber between the strong compressive spring and the diaphragm.

The known actuator rod extends to the pressure chamber through the pressure plate and the diaphragm and extends through a separation wall which is able to separate the spring actuator from the service brake actuator.

The end of the actuator is connected to the service chamber of the service brake actuator, so a fluid can flow between them.

If the parking brake is operated, the pressure of the spring brake actuator is discharged from the pressure chamber, and the strong compressive spring pushes the piston toward the separation wall between the spring brake actuator and the service brake actuator.

At this position, the actuator rod connected to the pressure plate operates the parking or emergency brake and is pushed so that the vehicle cannot be forcibly moved.

In order to unlock the parking brake, the pressure chamber is closed from the atmosphere, and the compressed air allows to expand the pressure chamber and to move the diaphragm and to move the pressure plate toward the opposite ends of the spring brake actuator housing, by which the pressure plate is inputted into the pressure chamber of the spring brake actuator which is able to compress the strong compressive spring.

If the spring to which a large compressive force is applied, is compressed in this spring brake actuator, the volume of the pressure chamber increases, and the volume of the spring chamber decreases, for which the pressure in the spring chamber increases, thus causing a problem.

Since the compressive air system for a heavy equipment vehicle is configured to operate at the maximum standard pressure, the pressure generated in the spring chamber may be multiplied.

The increases in the pressure of the engaged spring and the air pressure in the spring chamber cannot approach the maximum value at which the brake can appropriately operate.

If the combined force related with the pressure of the spring and the pressure generated in the spring chamber approaches the force which has been applied to the maximum, the brake may become a state where it cannot be unlocked, whereby the brake may be partly unlocked or may be very slowly unlocked.

DISCLOSURE OF THE INVENTION

Technical Problem

The present invention is made to resolve the aforementioned problems. It is an object of the present invention to provide a brake actuator which is able to allow for a reliable locking and unlocking of a brake and is able to allow to improve the buckling phenomenon of a compressive spring in such a way to prevent any over air pressure compression in a spring chamber of a pneumatic brake actuator and a pressure chamber.

Technical Solution

To achieve the above objects, there is provided a brake actuator which is able to adjust the operational states of a brake connection to the lower end of a push rod disposed movable upward or downward while passing through the lower end of a service brake housing in such a way that a diaphragm moves upward or downward a pressure plate in response to the elastic force of a compressive spring in a spring chamber and the adjustment of an air pressure in a pressure chamber, which may include, but is not limited to, a piston which is disposed at the service brake housing and is configured to divide the inside of a spring brake housing into a spring chamber and a pressure chamber which is disposed below the spring chamber; a hollow actuator rod which extends from the lower end of the piston; an actuator rod valve which is disposed at the lower end of the actuator rod; and a diaphragm which is disposed at the service brake housing and is configured to divide the inside of the service brake housing into a service chamber and a push rod chamber which is disposed below the service chamber, wherein the actuator rod valve is able to allow the air flow from the spring chamber to the service chamber if the compressed air is inputted into the pressure chamber.

The actuator rod valve is configured to close the air flow from the service chamber to the spring chamber if the compressed air is inputted into the service chamber.

The actuator rod valve may include a caging bolt head wherein an air flow hole is formed; and a pilot lip seal which is fixed at the outer surface of the caging bolt head and is configured to seal or open the outer side end of the air flow hole.

The air flow hole is provided multiple in number in a radial shape from the center of the caging bolt head.

Advantageous Effects

The present invention may be configured in such a way that the air flow between the spring chamber and the service chamber can be smoothly carried out via an actuator rod valve engaged to a lower end of the hollow actuator rod disposed between the spring chamber and the service chamber, by means of which the air pressure in the spring chamber can be always maintained constant, and when the compressive spring is compressed, the brake actuator can operate in a state where the central line does not lean in a predetermined direction, and the brake can be smoothly locked or unlocked in such a way to prevent any over compression of air in the spring chamber, and the buckling phenomenon of the compressive spring can be improved.

MODE FOR CARRYING OUT THE INVENTION

Figure 1:
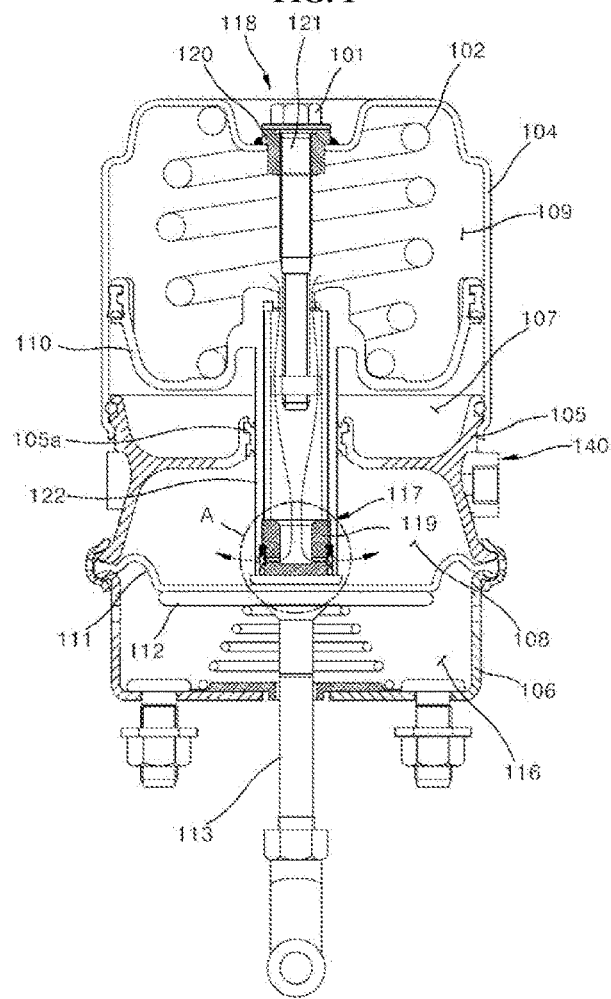
FIG. 1 is a cross sectional view illustrating a brake actuator according to an embodiment of the present invention, while showing a state wherein compressed air is flowing into a pressure chamber in a state where a parking brake has been activated.

The embodiments of the present invention will be described with reference to the accompanying drawings. The present invention is not limited to the embodiments disclosed below, and may be implemented in various forms, provided that such embodiments are provided to make perfect the disclosure of the present invention, and are also provided to let a person having ordinary skill in the art know the scopes of the present invention. The same reference numbers in the drawings represent same components.

The brake actuator according to an embodiment of the present invention may be manufactured in an integrated form or a separate form, if necessary. A part of the components may be eliminated depending on the use type.

When assigning a reference number to each component shown in the drawings, the same components are given the same reference numbers even though they are shown at different drawings. If it is judged that the descriptions on the related configuration or function could make unclear the subject matters of the present invention throughout the specification, the descriptions thereof may be omitted.

The terms "first, second, A, B, (a), (b), etc." may be used throughout the descriptions on the components of the present invention. These words are provided for the purpose of distinguishing one component from another component, not limiting the nature, sequence or order of a corresponding component. The description, for example, a component is "connected", "engaged" or "coupled" to another component, should be interpreted as representing that the component may be directly connected or coupled to another component, but another component may be "connected", "engaged" or "coupled" between other components.

Figure 2:
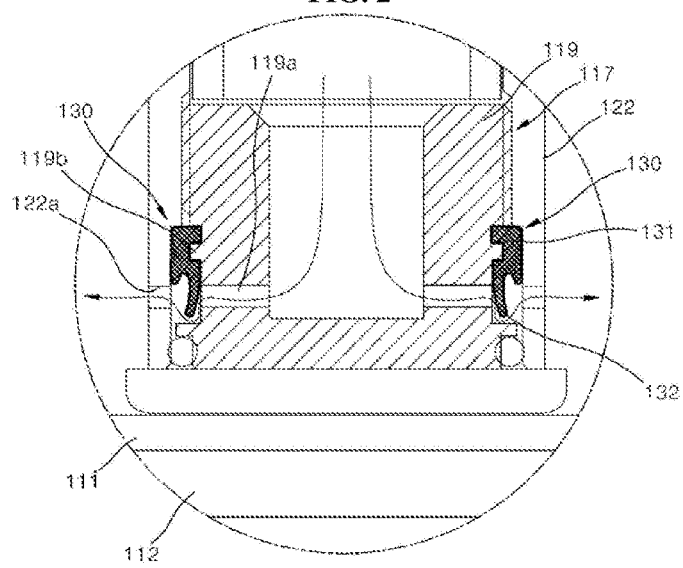
FIG. 2 is an enlarged view illustrating the portion (A) in FIG. 1.

FIG. 1 is a cross sectional view illustrating a brake actuator according to an embodiment of the present invention, while showing a state wherein compressed air is flowing into a pressure chamber in a state where a parking brake has been activated, and FIG. 2 is an enlarged view illustrating the portion (A) in FIG. 1.

The present invention is referred to a structure the air flow between a spring chamber 109 and a service chamber 108 both forming a brake actuator can be smoothly implemented through an actuator rod valve 117 engaged to a lower end of a hollow actuator rod disposed between the spring chamber 109 and the service chamber 108.

The present invention may allow to maintain constant the air pressure in the spring chamber 109 and may allow to implement a smooth operation without the centerline being leaned in one direction during the compression of a compressive spring 102.

The brake actuator according to the present invention may include, but is not limited to, a hollow spring brake housing 104, an adapter housing 105, and a service brake housing 106 which are disposed in sequence from the top of the brake actuator. The brake actuator may further include a piston 110 interposed between the spring brake housing 104 and the adapter housing 105, a diaphragm 111 interposed between the adapter housing 105 and the service brake housing 106, an actuator rod 122 which is engaged to a piston 110 and extends downward and passes through the adapter housing 105, and an actuator rod valve 117 which is disposed at a lower end of the actuator rod 122 and passes through the spring chamber 109 and the service chamber 108.

The space of the brake actuator according to the present invention may include a spring chamber 109 corresponding to an upper space of the piston 110 in the spring brake housing 104, a pressure chamber 107 corresponding to a lower space of the piston 110 in the spring brake housing 104, a service chamber 108 corresponding to a space formed of the adapter housing 105 and the diaphragm 111, and a push rod chamber 116 corresponding to a chamber between the diaphragm 111 and the service brake housing 106.

The compressive spring 102 is referred to a coil spring disposed in the spring chamber 109, wherein the diameter of the coil gradually increases from the lower side to the intermediate side in the height direction of the coil spring, and the diameter of the coil gradually decreases from the intermediate side to the upper side thereof.

The lower end of the compressive spring 102 may be supported contacting with the piston 110, and the upper end of the compressive spring 102 may be supported contacting with the upper end of the spring brake housing 104.

Meanwhile, a piston hole stopper guide (not illustrated) may be disposed at the upper end of the spring brake housing 104, while forming a curve along the inner side of the spring brake housing 104. The piston hole stopper guide may allow the compressive spring 102 to be compressed, while maintaining a constant center axis by preventing the position at the upper end of the compressive spring 102 from moving.

The piston 110 contacts close with the inside of the spring brake housing 104 and separates the internal space of the spring brake housing 104 into the pressure chamber 107 and the spring chamber 109.

To this end, the piston 110 may be formed contacting close with the inside of the spring brake housing 104.

A hollow actuator rod 122 may be provided in a through hole formed inside of the piston 110. The upper end of the actuator rod 122 is supported contacting with the upper end of the piston 110, and the lower end of the actuator rod 122 passes through the through hole of the adapter housing 105 and is supported contacting with the diaphragm 111.

A caging bolt assembly 118 may be formed from the outer side to the inner side of the spring brake housing 104 inside the hollow actuator rod 122. The caging bolt assembly 118 may include an adjusting nut 101 which is thread-engaged with a caging bolt 121.

The caging bolt 118 may allow to dispose a caging bolt 121 and a caging bolt head 119 inside the hollow actuator rod 122 and may allow extend the other end of the caging bolt 121 through an opening in the axial direction and may be thread-fixed through a collar 120 in a sealed state. The adjusting nut 101 may be permanently fixed at the caging bolt 121.

The caging bolt assembly 118 may be sued to mechanically contract and support the compressive spring 102 to which a great compressed strength can be applied. The thread engagement of the caging bolt 121 to the spring brake housing 104 may be disengaged by rotating the adjusting nut 101.

The compressive spring to which a great strength can be applied, is related to a known technology, and it may be used if a compressive air system is broken or a mechanical unlocking of the brake is necessary or it needs to assemble a brake actuator.

An adapter housing 105 may be disposed below the spring brake housing 104, wherein the adapter housing 105 will be connected with the service brake housing 106.

A through hole may be formed inside of the adapter housing 105. The actuator rod 122 can be supported contacting with the diaphragm 111 inside the service brake housing 106 through the through hole.

A sealing assembly 105a may be provided at a portion where the hollow actuator rod 122 contacts with the adapter housing 105 so as to prevent any leakage of fluid, namely, it may be provided outside the hollow actuator rod 122.

The diaphragm 111 may be provided inside the service brake housing 106 forming the lower housing, wherein the diaphragm 111 is supported contacting with the pressure plate 112 and is configured to divide the service brake housing 106 into a service chamber 108 and a push rod chamber 116.

The pressure plate 112 may be supported by the push rod 113 and is able to transfer the movement due to the air pressure of the diaphragm 111 to the push rod 113.

Since the diaphragm 111 moves upward and downward the pressure plate 112 based on the elastic force of the compressive spring 102 inside the spring chamber 109 and the adjustment of the air pressure in the pressure chamber 107, it can be possible to adjust the operational states of the brake (not illustrated) connected to the lower end of the push rod 113 which is disposed movable upward and downward through the lower end of the service brake housing 106.

Meanwhile, the spring brake housing 104, the adapter housing 105 and the service brake housing 106 may be collectively called a housing which may be used as a cover covering the outer surface of the brake actuator according to the present invention.

Referring to FIG. 2, an actuator rod valve 117 may be provided at the lower end of the hollow actuator rod 122 disposed in the through hole inside the piston 110 so as to communicate the interior of the actuator rod 122 with the service chamber 108. The actuator rod valve 117 may include a caging bolt head 119 wherein an air flow hole 119a is formed, and a pilot lip seal 130. The air flow hole 119a may be formed near the rod hole 122a formed at the actuator rod 122, thus consequently forming a communicating structure.

The pilot lip seal 130 may be fixed at the outer surface of the caging bolt head 119 and is able to seal the outer side end of the air flow hole 119a.

As for the whole internal air flow structure, in a state where the upper and lower ends of the hollow actuator rod 122 are disposed at the spring chamber 109 and the service chamber 108, the pilot lip seal 130 is able to close or open the air flow hole 119a, so the air flow from the spring chamber 109 to the service chamber 108 can be possible.

The pilot lip seal 130 may include a seal body 131 fixed at a protrusion part 119b formed at the outer surface of the caging bolt head 119, and a seal movable part 132 which extends downward from the seal body 131.

The caging bolt head 119 may include a plurality of air flow holes 119a formed in a radial shape from the center thereof, and the ring-shaped pilot lip seal 130 may be configured to cover the outer sides of a plurality of the air flow holes 119a.

In the aforementioned structure, the seal movable part 132 of the pilot lip seal 130 may be disposed at an outer end of the air flow hole 119a. The seal movable part 132 may be made of a smooth material so that the seal movable part 132 can be bent if it receives a high pressure air from the inside of the caging bolt head 119. If a high pressure is strongly applied to the pilot lip seal 130 through a procedure where a high pressure air is supplied from the spring chamber 109 through the inside of the actuator rod 122, the seal movable part 132 may be separated from the air flow hole 119a, by which the air flow through the air flow hole 119a can be possible.

Even though the compressed air is inputted into the pressure chamber 107, and the compressive spring 102 is compressed, and at the same time, the internal pressure of the spring chamber 109 increases, the compressive spring 102 can smoothly operate without leaning toward the center line, and the locking and unlocking of the brake can be smoothly carried out by preventing the over compression of the air in the spring chamber 109.

Referring back to FIGS. 1 and 2, the state where the parking brake is unlocked in a state where the vehicle has been parked, will be described.

Compressed air may be inputted into the pressure chamber 107 of the brake actuator through a valve structure 140 through a procedure where the parking brake is being unlocked.

In this state, the compressive spring 102 may be slowly compressed due to the input of the compressed air into the pressure chamber 107, and the piston 110 will slowly move upward.

The internal pressure of the spring chamber 109 will increase due to the upward movement of the piston 110, and the compressed air in the spring chamber 109 the pressure of which has been increased, may be finally moved to the service chamber 108 through the hollow part of the actuator rod 122 and the actuator rod valve 117. In this way, the parking brake can be unlocked, and the functions carried out throughout the actuator rod valve 117 may be same as the previously described functions.

Figure 3:
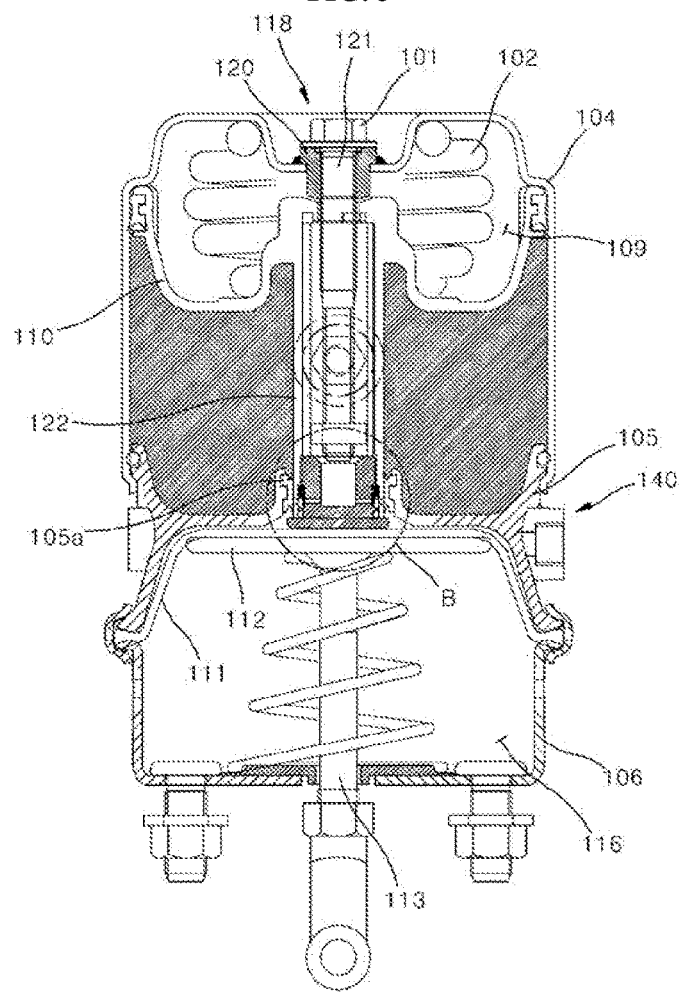
FIG. 3 is a cross sectional view illustrating a brake actuator when a vehicle is being driven, while showing a state where a compressive spring has been compressed to the maximum after compressed air is fully filled in the pressure chamber.
Figure 4:
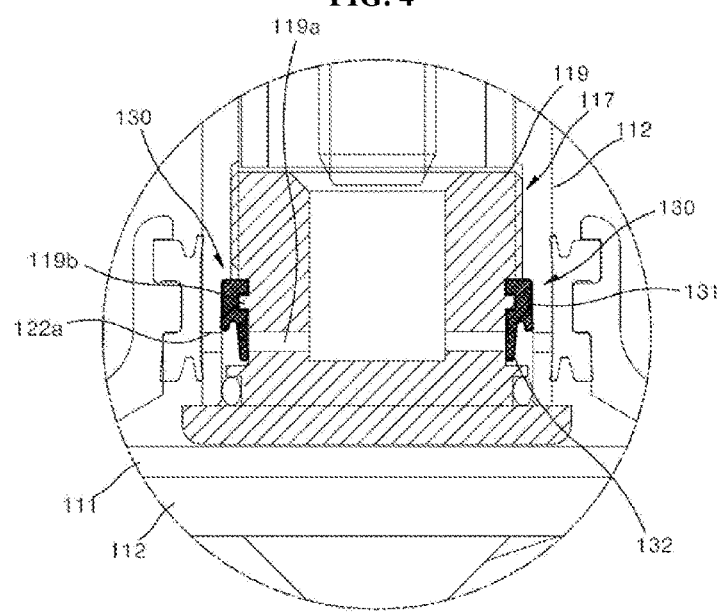
FIG. 4 is an enlarged view of the portion (B) in FIG. 3.

FIG. 3 is a cross sectional view illustrating a brake actuator when a vehicle is being driven, while showing a state where a compressive spring has been compressed to the maximum after compressed air is fully filled in the pressure chamber, and FIG. 4 is an enlarged view of the portion (B) in FIG. 3.

The operational state of the brake actuator when the vehicle is being driven, will be described with reference to FIGS. 3 and 4.

While the vehicle is being driven, the compressed air has been fully filled from an external compressor (not illustrated) into the pressure chamber 107 of the brake actuator through the valve structure 140.

The portion where air is inputted, is not illustrated in the drawings, but it may be formed through one side of the adapter housing 105 or the spring brake housing 104. This configuration is not limited thereto. Any other configurations may be adapted as long as it is able to inject air into the pressure chamber 107, As the compressed air is injected into the pressure chamber 107, the air pressure in the pressure chamber 107 will increase. The air in the pressure chamber 107 may create the pressure outside the pressure chamber due to the increased air pressure.

The piston 110 which has become movable upward and downward such a pressure, can move upward.

Consequently, the compressive spring 102 is compressed and contracted, and the piston 110 will move upward together with the actuator rod 122.

If the compressive spring 102 is contracted, the space inside the spring chamber 109 may naturally and slowly decrease. For this reason, the air in the spring chamber 109 may move to the service chamber 108 through the inside of the actuator rod 122 and the air flow holes 119a. The air in the service chamber 108 may be discharged to the outside through the valve structure 140 as the volume of the service chamber 108 decreases.

Since the internal air pressure of the spring chamber 109 can be maintained constant, the unlocking of the brake can be easily carried out.

If the piston 110 moves upward to the maximum, the rod holes 122a of the actuator rod 122 may contact with the sealing assembly 105a, thus closing the air flow through the air flow holes 119a.

Moreover, a spring may be installed at a lower end of the pressure plate 112 so as to provide a recovery force. The pressure plate 112 can move upward with the aid of the recovery force of the spring. Consequently, the push rod 113 disposed vertical at the lower end of the pressure plate 112 can move upward together.

As the push rod 113 moves upward into the inside of the brake actuator, the brake pad (not illustrated) will separate from the brake disk or drum (not illustrated). In this way, the brake can be unlocked, and the vehicle can be driven.

Figure 5:
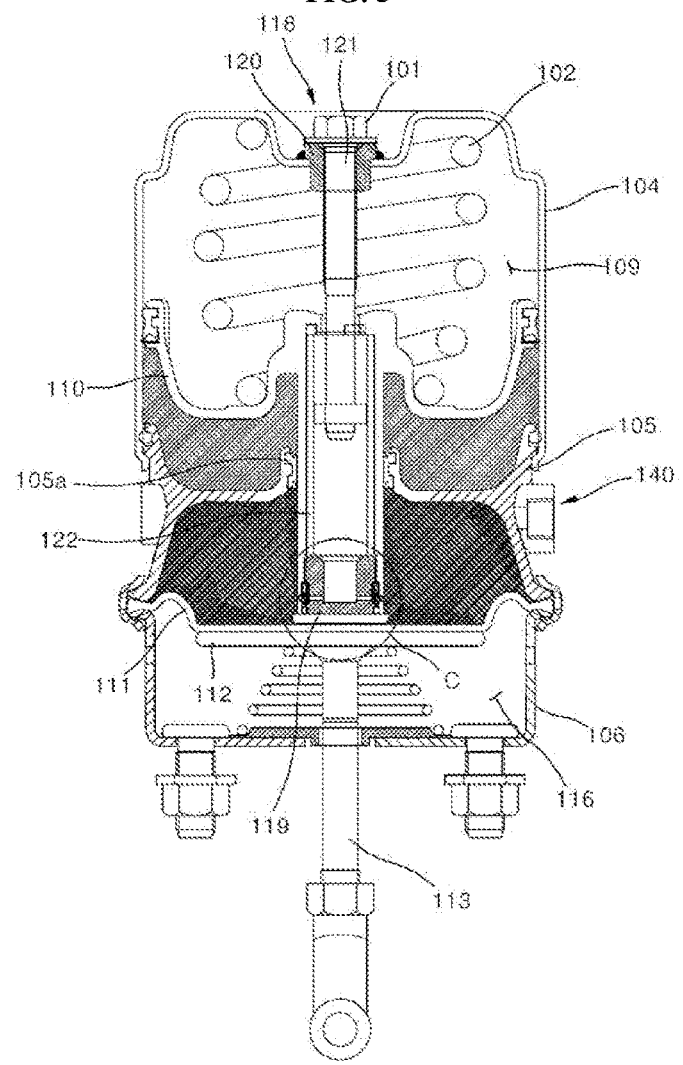
FIG. 5 is a cross sectional view illustrating a brake actuator in a state where a foot brake is temporarily pressed when a vehicle is being driven.
Figure 6:
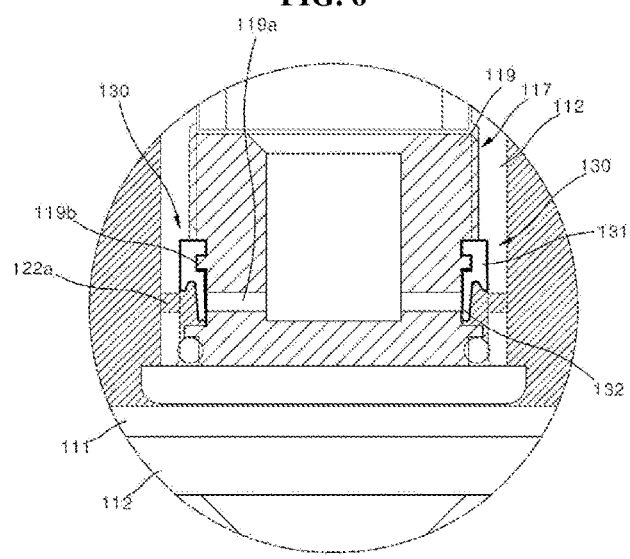
FIG. 6 is an enlarged view of the portion (C) in FIG. 5.

FIG. 5 is a cross sectional view illustrating a brake actuator in a state where a foot brake is temporarily pressed when a vehicle is being driven. FIG. 6 is an enlarged view of the portion (C) in FIG. 5.

Referring to FIGS. 5 and 6, the operational state of the brake actuator will be described when the foot brake is temporarily pressed in a state where the vehicle is being driven.

In the vehicle driving state, the compressed air may remain filled in the pressure chamber 107. If the foot brake becomes operative, the compressed air of a high pressure will be inputted into the service chamber 108 through the valve structure 140. In this case, the pressure of the compressed air which has been inputted into the service chamber 108 will remain higher than the pressure of the compressed air in the pressure chamber 107.

Even though the air pressure is strongly applied from the outside of the pilot lip seal 130, since the seal movable part 132 is strongly contacting close with the outer side end of the air flow hole 119a, the air flow through the air flow holes 119a can be prevented.

Even though the compressed air of a high pressure is inputted into the service chamber 108, any pressure loss through the air flow holes 119a can be prevented.

As the service chamber 108 expands, the pressure plate 112 may be pushed downward, and consequently, the push rod 113 disposed vertical at the lower end of the pressure plate 112 can move downward.

As the push rod 113 moves downward toward the brake actuator, the brake pad (not illustrated) may approach the brake disk or drum (not illustrated), for which the locked state of the brake can be temporarily maintained.

The brake actuator according to the present invention is able to open the air flow from the spring chamber to the service chamber and close the air flow the reverse direction thereof based on each operational condition with the aid of the actuator rod valve which is able to control the internal air circulations below the hollow actuator rod of the actuator, whereby the present invention is able to provide a simplified configuration while providing the same functions as the implementation method of the conventional complicated configuration.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. A brake actuator which is able to adjust the operational states of a brake connection to the lower end of a push rod disposed movable upward or downward while passing through the lower end of a service brake housing in such a way that a diaphragm moves upward or downward a pressure plate in response to the elastic force of a compressive spring in a spring chamber and the adjustment of an air pressure in a pressure chamber, the brake actuator comprising:
- a piston which is disposed at a spring brake housing and is configured to divide the inside of the spring brake housing into the spring chamber and the pressure chamber which is disposed below the spring chamber;
- a hollow actuator rod which extends from the lower end of the piston; and
- an actuator rod valve which is disposed at the lower end of the actuator rod;
- wherein the diaphragm is disposed in the service brake housing and is configured to divide the inside of the service brake housing into a service chamber and a push rod chamber which is disposed below the service chamber, wherein the actuator rod valve is able to allow the air flow from the spring chamber to the service chamber if compressed air is inputted into the pressure chamber,
- wherein the actuator rod valve comprises:
  - a caging bolt head in which a plurality of air flow holes are formed in a radial shape from the center of the caging bolt head; and
  - a pilot lip seal which is fixed at the outer surface of the caging bolt head and is configured to seal or open the outer side ends of the air flow holes,
- wherein the pilot lip seal comprises a seal body fixed at a protrusion part formed at the outer surface of the caging bolt head, and a seal movable part which extends downward from the seal body,
- wherein the seal movable part seals or opens the air flow holes that is provided multiple in number.

2. The actuator of claim 1, wherein the actuator rod valve is configured to close the air flow from the service chamber to the spring chamber if the compressed air is inputted into the service chamber.

3. A brake actuator comprising:
- a piston which is configured to divide the inside of a spring brake housing into a spring chamber and a pressure chamber which is disposed below the spring chamber;
- a hollow actuator rod which extends from the lower end of the piston;
- an actuator rod valve which is disposed at the lower end of the actuator rod, the actuator rod valve comprising:
  - a caging bolt head in which a plurality of air flow holes are formed in a radial shape from the center of the caging bolt head; and
  - a pilot lip seal which is fixed at the outer surface of the caging bolt head and is configured to seal or open the outer side ends of the air flow holes; and
- a diaphragm which is configured to divide the inside of a service brake housing into a service chamber and a push rod chamber which is disposed below the service chamber,
- wherein the pilot lip seal comprises a seal body fixed at a protrusion part formed at the outer surface of the caging bolt head, and a seal movable part which extends downward from the seal body,
- wherein the seal movable part seals or opens the air flow holes.

* * * * *